(12) United States Patent
Sugiura

(10) Patent No.: US 7,420,633 B2
(45) Date of Patent: Sep. 2, 2008

(54) LIQUID CRYSTAL DISPLAY HAVING PARTICULAR IRREGULARITY CONTROLLING STRUCTURE

(75) Inventor: Norio Sugiura, Kawasaki (JP)

(73) Assignees: Fujitsu Limited, Kawasaki (JP); Au Optronics Corporation, Hsinchu (TW)

( * ) Notice: Subject to any disclaimer, the term of this patent is extended or adjusted under 35 U.S.C. 154(b) by 318 days.

(21) Appl. No.: 11/035,403

(22) Filed: Jan. 13, 2005

(65) Prior Publication Data

US 2006/0033866 A1 Feb. 16, 2006

(30) Foreign Application Priority Data

Aug. 11, 2004 (JP) .............................. 2004-234270

(51) Int. Cl.
 *G02F 1/1335* (2006.01)
 *G02F 1/1337* (2006.01)
 *G02F 1/1339* (2006.01)

(52) U.S. Cl. ..................... 349/113; 349/130; 349/155

(58) Field of Classification Search ......... 349/113–114, 349/130, 155, 190
See application file for complete search history.

(56) References Cited

U.S. PATENT DOCUMENTS

| | | | | |
|---|---|---|---|---|
| 5,552,910 | A * | 9/1996 | Okano | ............... 349/50 |
| 6,002,464 | A | 12/1999 | Fujisawa et al. | |
| 6,051,289 | A | 4/2000 | Tsujimoto et al. | |
| 6,788,375 | B2 * | 9/2004 | Ogishima et al. | ............ 349/130 |
| 6,850,309 | B2 * | 2/2005 | Inoue et al. | ................. 349/157 |
| 6,856,363 | B2 | 2/2005 | Kim | |
| 6,862,057 | B2 * | 3/2005 | Sakamoto et al. | ........... 349/113 |
| 6,882,388 | B2 | 4/2005 | Sugiura et al. | |
| 6,888,596 | B2 * | 5/2005 | Nakayoshi et al. | .......... 349/113 |
| 6,970,214 | B2 | 11/2005 | Sato et al. | |
| 7,098,977 | B2 * | 8/2006 | Sugiura et al. | ............. 349/113 |

FOREIGN PATENT DOCUMENTS

| | | |
|---|---|---|
| EP | 0 516 489 A2 | 12/1992 |
| JP | 2002-221716 | 8/2002 |
| JP | 2002-296585 | 10/2002 |
| JP | 2003-121820 | 4/2003 |
| JP | 2003-215574 | 7/2003 |
| JP | 2004-151572 | 5/2004 |
| JP | 2004-177874 | 6/2004 |

OTHER PUBLICATIONS

Kubo et al,; "Development of Advanced TFT with Good Legibility under any Intensity of Ambient Light"; IDW '99 Digest; pp. 183-186.

* cited by examiner

*Primary Examiner*—Mike Qi
(74) *Attorney, Agent, or Firm*—Greer, Burns & Crain, Ltd.

(57) ABSTRACT

The invention relates to a reflective or reflective/transmissive liquid crystal display having a light-reflecting layer and provides a low-cost light crystal display having high controllability of the thickness of a liquid crystal layer. The liquid crystal display has a wrinkly irregular layer having a wrinkly irregular surface formed such that it follows irregularity controlling structures on a glass substrate. The liquid crystal display also has a plurality of holding protrusions which are formed to protrude from an opposite glass substrate and which hold the two substrates so as to leave a predetermined gap between them. The holding protrusions which have substantially the same length are formed at predetermined intervals such that they contact the tops of convexes of the wrinkly irregular layer, which makes it possible to control the thickness of the liquid crystal layer into agreement with a design value easily.

13 Claims, 5 Drawing Sheets

LIQUID CRYSTAL DISPLAY HAVING PARTICULAR IRREGULARITY CONTROLLING STRUCTURE

BACKGROUND OF THE INVENTION

1. Field of the Invention

The present invention relates to a liquid crystal display used in a display section of an electronic apparatus and, more particularly, to a reflective or reflective/transmissive liquid crystal display having a light-reflecting layer.

2. Description of the Related Art

Reflective/transmissive liquid crystal displays (transflective liquid crystal displays) have been developed in order to achieve preferable display both indoors and outdoors. A transflective liquid crystal display performs display utilizing light emitted by a backlight unit or external light from its surroundings such as sun light or light from a room lamp.

FIG. 6 shows a section of one pixel of a transflective liquid crystal display disclosed in Non-Patent Document 1. As shown in FIG. 6, the transflective liquid crystal display has two substrates 102 and 104 disposed to be opposite to each other and a liquid crystal layer 112 sealed between the two substrates 102 and 104. A plurality of source bus lines 106 (two of which are shown in FIG. 6) are formed on the substrate 102. Further, an insulation film 105 is formed throughout the substrate 102 so as to cover the source bus lines 106. A transparent electrode 108 is formed on the insulation film 105 substantially in the middle of the two source bus lines 106. The transparent electrode 108 transmits light emitted by a backlight unit (not shown) provided on the side of the substrate 102.

An acrylic resin layer 110 having irregularities on the surface thereof facing the substrate 104 is formed on the insulation film 105 excluding the region where the transparent electrode 108 is formed. The acrylic resin layer 110 is formed with a thickness that is substantially one half of the width of the gap between the substrates 102 and 104. Reflective electrodes 114 which follow the shape of the irregularities of the acrylic resin layer 110 are formed on the acrylic resin layer 110. The reflective electrodes 114 are electrically connected to the transparent electrode 108. The irregularities on the surface of the reflective electrodes 114 cause scatter reflection of light that impinges thereupon from the side of the substrate 104.

On the surface of the substrate 104 facing the substrate 102, a black matrix 116 formed in positions substantially opposed to the source bus lines 106, and a color filter (CF) layer 118 and a transparent electrode 120 formed throughout the substrate 104 are formed.

As shown in FIG. 6, each pixel of the transflective liquid crystal display has a reflective area in which a reflective electrode 114 having irregularities is formed and a transmissive area in which a transparent electrode 108 transmitting light from the backlight unit is formed. The transflective liquid crystal display is therefore capable of displaying an image utilizing light emitted by the backlight unit or external light such as sun light or light from a room lamp.

Transflective liquid crystal displays according to the related art have a problem in that they are very much expensive because a photolithographic process is used to form a reflective area. In order to reduce cost, the inventors developed a technique for forming a diffusing reflective electrode having wrinkly irregularities without using a photolithographic process, and combined the technique with a vertically aligned liquid crystal, and realized a reflective liquid crystal display having a high reflectivity and a high contrast ratio (see Patent Document 1). Further, the inventors developed a technique in which the orientation of wrinkly irregularities is controlled by providing a structure underlayer of the wrinkly irregularities layer (see Patent Document 2).

Patent Document 1: JP-A-2002-221716
Patent Document 2: JP-A-2003-215574
Non-Patent Document 1: IDW '99 Digest p. 183

Referring to FIG. 6, the transflective liquid crystal display must have a multi-gap structure in which the thickness of the liquid crystal layer 112 is varied to cause light to travel equal optical distances when it is transmitted by the liquid crystal layer 112 in the transmissive area and the reflective area. In order to achieve this, the acrylic resin layer 110 is formed with a thickness that is substantially one half of the width of the gap between the substrates 102 and 104, so that the beams of light transmitted by the liquid crystal layer 112 in the transmissive area and the reflective area travel optical paths having substantially the same length. However, there is no mention on how to control the thickness of the liquid crystal layer 112 between the substrates 102 and 104 of the transflective liquid crystal display where the thickness of the liquid crystal layer 112 varies between the same substrates.

SUMMARY OF THE INVENTION

It is an object of the invention to provide a low-cost liquid crystal having high controllability of the thickness of the liquid crystal layer thereof.

The above-described object is achieved by a liquid crystal display, characterized in that it has a wrinkly irregular layer having a wrinkly irregular surface formed on a substrate, an opposite substrate disposed to be opposite to face the side of the substrate on which the wrinkly irregular layer is formed, a liquid crystal layer sealed between the substrate and the opposite substrate, an irregularity controlling structure formed under the wrinkly irregular layer on the substrate for controlling the orientation of the irregularities of the wrinkly irregular layer, and a holding protrusion formed on either concaves or convexes of the wrinkly irregular layer for holding the substrate and the opposite substrate with a predetermined gap left between them.

The invention makes it possible to provide a low-cost liquid crystal display having high controllability of the thickness of the liquid crystal layer thereof.

DESCRIPTION OF THE PREFERRED EMBODIMENT

Figure 1:
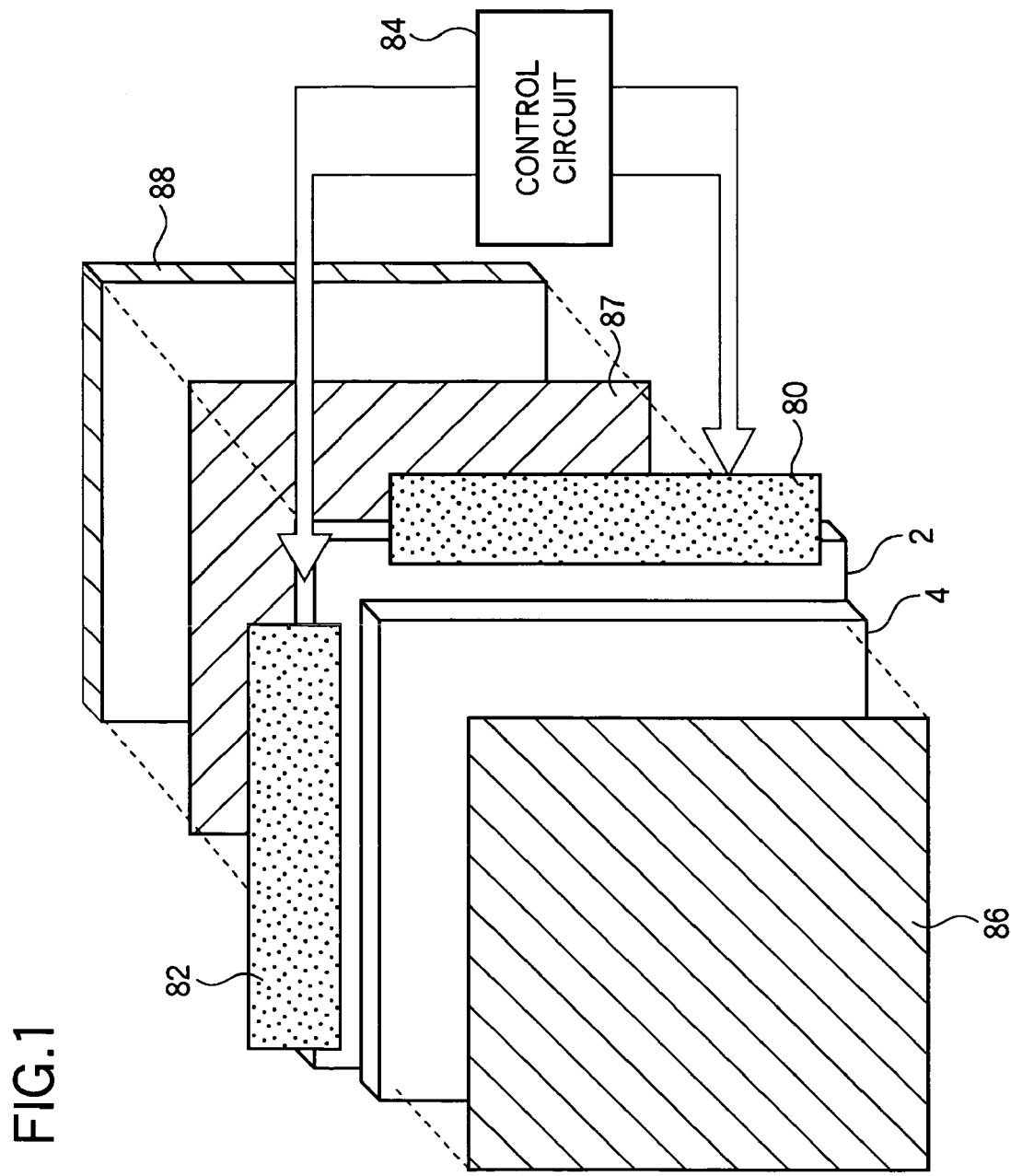
FIG. 1 shows a schematic configuration of a transflective liquid crystal display as an example of a liquid crystal display in a mode for carrying out the invention.

A liquid crystal display in a mode for carrying out the invention will now be described with reference to FIGS. 1 to 5. First, a schematic configuration of a transflective liquid crystal display which is an example of a liquid crystal display in the present mode for carrying out the invention will be described with reference to FIG. 1. As shown in FIG. 1, the transflective liquid crystal display has a liquid crystal display panel which is provided by combining a TFT substrate 2 having a reflective electrode made of a light-reflecting material and a thin film transistor (TFT) formed at each pixel region and an opposite substrate 4 formed with a resin CF layer and a common electrode, the substrates being combined in a face-to-face relationship with each other, and sealing a liquid crystal between the substrates.

A gate bus line driving circuit 80 having a driver IC for driving a plurality of gate bus lines and a drain bus line driving circuit 82 having a driver IC for driving a plurality of drain bus lines are provided on the TFT substrate 2. The driving circuits 80 and 82 output scan signals and data signals to predetermined gate bus lines or drain bus lines, respectively, based on predetermined signals output by a control circuit 84.

The opposite substrate 4 has a resin CF later formed in any of red (R), green (G) and blue (B) at each pixel region. Alignment films for aligning liquid crystal molecules in a predetermined direction are formed on surfaces of the substrates 2 and 4 which face each other.

A polarizer 87 is applied to a surface of the TFT substrate 2 opposite to the surface on which the elements are formed. A backlight unit 88 which is constituted by, for example, a linear primary light source and a planar light guide plate is provided on the side of the polarizer 87 opposite to the side thereof facing the TFT substrate 2. A polarizer 86 is applied to a surface of the opposite substrate 4 opposite to the surface on which the color filters are formed.

Figure 2:
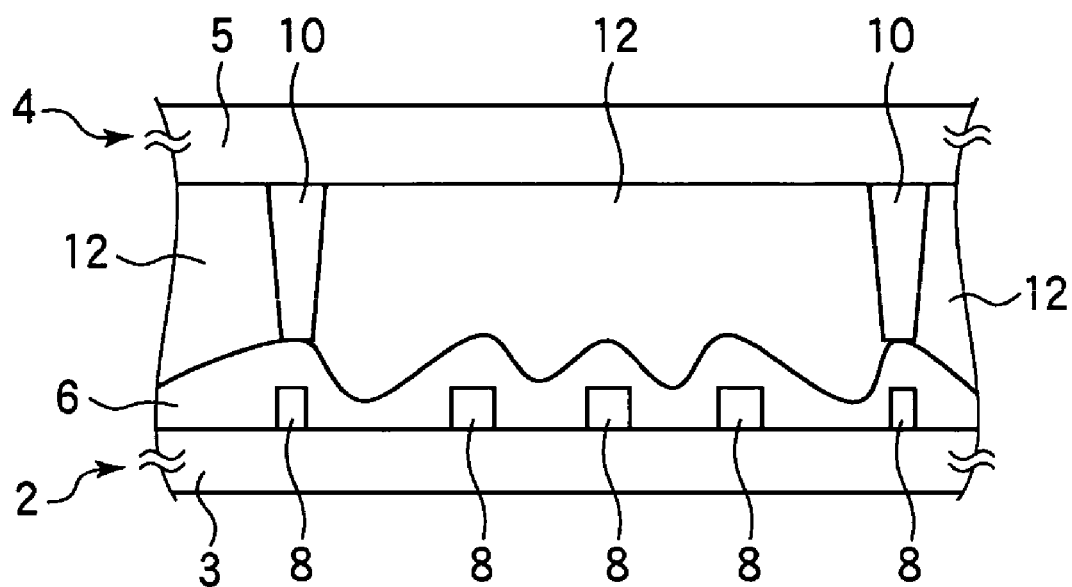
FIG. 2 is a sectional view of the liquid crystal display in the mode for carrying out the invention taken in a direction that is perpendicular to the display screen.

FIG. 2 shows a part of a section of the liquid crystal display in the present mode for carrying out the invention taken in a direction perpendicular to the display screen thereof. As shown in FIG. 2, the liquid crystal display has a glass substrate 3 constituting the TFT substrate 2 on which TFT and other things (not shown) are formed, an opposite glass substrate 5 constituting the opposite substrate 4 provided opposite to the TFT substrate 2, and a liquid crystal layer 12 sealed between the substrates 3 and 5. A wrinkly irregular layer 6 having a wrinkly irregular surface is formed on the glass substrate 3. For example, the wrinkly irregular layer 6 is formed of a photosensitive resin such as a novolac type positive resist and the like.

A plurality of irregularity controlling structures 8 for controlling the orientation of the irregularities of the wrinkly irregular layer 6 (five of which are shown in FIG. 2) are formed under the wrinkly irregular layer 6 on the glass substrate 3. The irregularity controlling structures 8 are formed in a predetermined configuration from a material which is different from the wrinkly irregular layer 6 in thermal deformation characteristics. Since the irregularity controlling structures 8 are formed on the glass substrate 3, the wrinkly irregularities, which are formed on the surface of the wrinkly irregular layer 6 as a result of thermal shrinkage of the layer, are formed along the irregularity controlling structures 8. The wrinkly irregularities of the wrinkly irregular layer 6 make it possible to obtain an optimum distribution of inclined surfaces constituted by irregularities for reflection, and it is therefore possible to improve the reflectivity of the liquid crystal display.

Holding protrusions 10 are formed on the opposite glass substrate 5 facing the glass substrate 3, the protrusions protruding from the opposite glass substrate 5 to hold the substrates 3 and 5 with a predetermined gap left between them. The positions of concaves and convexes of the wrinkly irregular layer 6 in the plane of the glass substrate 3 and the heights of the same can be controlled by the pattern in which the irregularity controlling structures 8 are formed. Therefore, the thickness of the liquid crystal layer 12 can be easily controlled into agreement with a design value by, for example, forming the irregularity controlling structures 8 such that the convex portions of the wrinkly irregular layer 6 have a uniform height above the glass substrate 3 and forming the holding protrusions 10 with substantially the same length at predetermined intervals such that they contact the tops of convexes of the wrinkly irregular layer 6, as shown in FIG. 2. In order to control the thickness of the liquid crystal layer 12 such that it becomes constant, the holding protrusions 10 may be formed in contact with the tops of concaves of the wrinkly irregular layer 6. Alternatively, the protrusions may be formed such that they protrude from concaves or convexes of the wrinkly irregular layer 6 to contact the opposite glass substrate 5.

As described above, in the liquid crystal display in the present mode for carrying out the invention, the concaves or convexes of the wrinkly irregularities formed on the surface of the wrinkly irregular layer 6 are controlled a substantially uniform height by the irregularity controlling structures 8 formed on the glass substrate 3. Therefore, the thickness of the liquid crystal layer 12 can be easily controlled into agreement with a design value by forming the holding protrusions 10 formed substantially the same length at predetermined intervals such that they contact either the concaves or convexes of the wrinkly irregular layer 6. Further, since the wrinkly irregularities can be formed on the surface of the wrinkly irregular layer 6 without using a photolithographic process, the liquid crystal display can be provided at a low cost.

A more specific description will now be made with reference to embodiments of the invention.

Embodiment 1

Figure 3A:
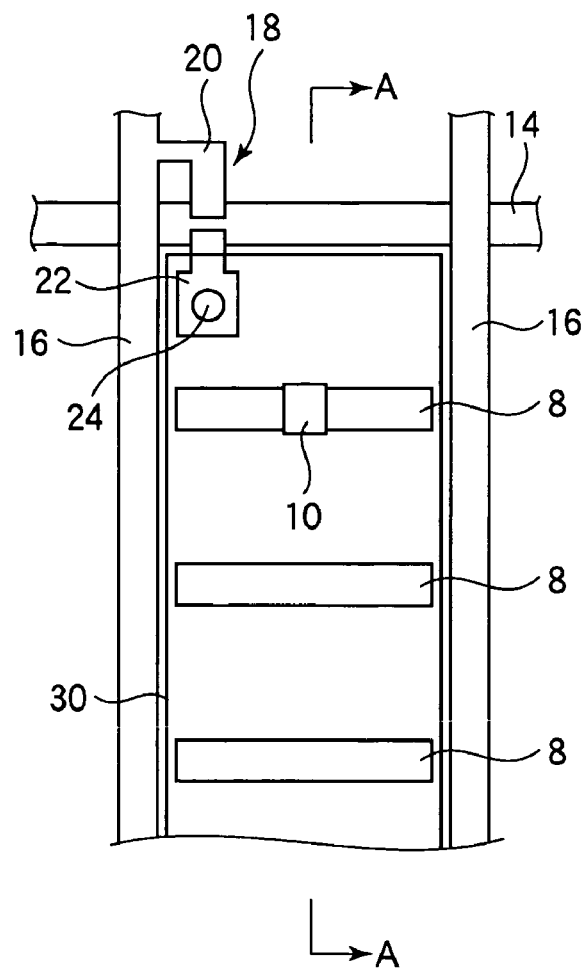
FIGS. 3A and 3B show a configuration of one pixel and the neighborhood thereof in a reflective liquid crystal display which is Embodiment 1 of a liquid crystal display in the mode for carrying out the invention.
Figure 3B:
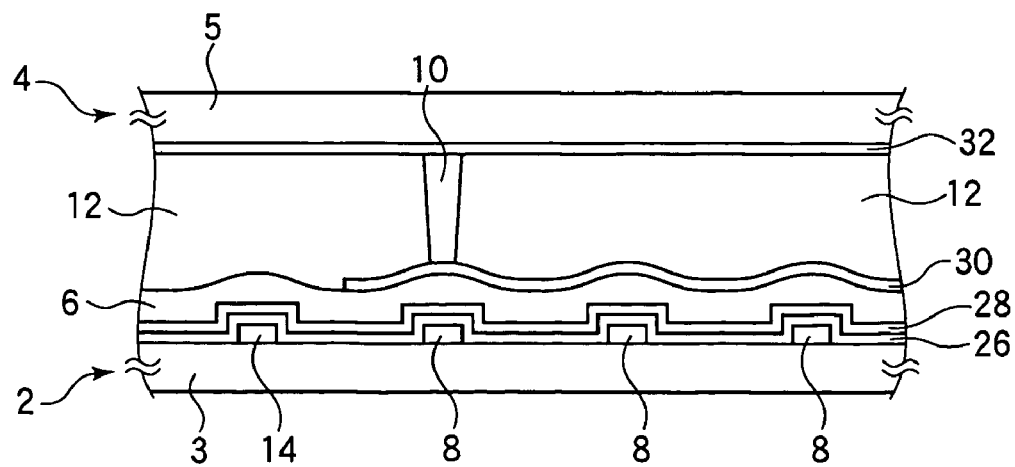

FIGS. 3A and 3B show a configuration of one pixel and the neighborhood thereof in a liquid crystal display panel used in a reflective liquid crystal display. FIG. 3A is a view of the configuration of the pixel and the neighborhood taken in a direction that is normal to the display screen. FIG. 3B shows a section taken along the line A-A in FIG. 3A. As shown in FIGS. 3A and 3B, gate bus lines 14 extending in the horizontal direction of FIG. 3A are formed on a glass substrate 3 constituting a TFT substrate 2. An insulation film 26 is formed throughout the substrate over the gate bus lines 14. Drain bus lines 16 extending in the vertical direction of FIG. 3A are formed such that they intersect the gate bus lines 14 with the insulation film 26 interposed between them. TFTs 18 are formed in the vicinity of the intersections between the gate bus lines 14 and the drain bus lines 16. A TFT 18 has an active semiconductor layer (not shown) constituted by, for example, an a-Si layer that is provided on the insulation film 26. A channel protection film (not shown) is formed on the active semiconductor layer. On the channel protection film, a drain electrode 20, which is an extension from the adjacent drain bus line 16, and a source electrode 22 are formed opposite to each other with a predetermined gap left between them. In such a configuration, the gate bus line 14 located directly under the channel protection film functions as a gate electrode of the TFT 18. A final protection film 28 is formed on the insulation film 26.

A wrinkly irregular layer 6 made of a photosensitive resin, e.g., a novolac type positive resist is formed on the final protection film 28. Wrinkly irregularities are formed on the surface of the wrinkly irregular layer 6 such that they follow the shape of irregularity controlling structures 8 formed on the glass substrate 3. A plurality of irregularity controlling structures 8 are formed between the drain bus lines 16 at predetermined intervals, the structures being substantially in parallel with the gate bus lines 14. The irregularity controlling structures 8 are formed of the same material, in the same layer, and at the same time as the gate bus lines 14. A reflective electrode 30, which is a light-reflecting layer made of a light-reflecting material, is formed on the wrinkly irregular layer 6 in each pixel region. Wrinkly irregularities that follow the shape of the surface of the wrinkly irregular layer 6 are formed on the surface of the reflective electrode 30. The reflective electrode 30 has a high light-scattering property because of the wrinkly irregularities formed on the surface thereof and reflects external light incident thereupon so as to scatter it in various directions. The reflective electrode 30 is electrically connected to the source electrode 22 of the TFT 18 through a contact hole 22 that is formed by providing an opening in the final protection film 28 on the source electrode 22.

An opposite substrate 4 has a CF layer, which is not shown, provided on an opposite glass substrate 5. A transparent electrode 32 is formed throughout the substrate over the CF layer. The transparent electrode 32 is formed of, for example, an indium tin oxide (ITO). Holding protrusions 10 protruding from the transparent electrode 32 are formed so as to extend up to convexes of the reflective electrode 30. Therefore, the reflective electrode 30 is also formed between the holding protrusions 10 and the wrinkly irregular layer 6. The height of the concaves or convexes of the wrinkly irregular layer 6 is formed substantially uniform by the irregularity controlling structures 8. Therefore, a gap between the TFT substrate 2 and the opposite substrate 4 is maintained at a predetermined width by forming the plurality of holding protrusions 10 having substantially the same length at predetermined intervals on the convexes of the reflective electrode 30, which makes it possible to control the thickness of the liquid crystal layer 12 such that it becomes substantially constant.

Since the irregularity controlling structures 8 can be formed at the same time when the gate bus lines 14 are formed, a cost reduction can be achieved without any need for a special manufacturing step. Obviously, the irregularity controlling structures 8 may be formed of the same material, in the same layer, and at the same time as the drain bus lines 16, and the structures 8 may alternatively be formed as structures having two layers which are formed of the same materials, in the same layers, and at the same times as the gate bus lines 14 and the drain bus lines 16, respectively. The thickness of the liquid crystal layer 12 can be controlled to be substantially constant also in this case because the wrinkly irregularities of the wrinkly irregular layer 6 can be formed in a predetermined shape.

As described above, in the present embodiment, the thickness of the liquid crystal layer 12 of the liquid crystal display panel used in a reflective liquid crystal display can be easily controlled so as to agree with a design value. Further, since the irregularity controlling structures 8 can be formed of the same material, in the same layer, and at the same time as the gate bus lines 14 or the like, the cost of a liquid crystal display can be reduced without any increase in the number of manufacturing steps.

Embodiment 2

Figure 4:
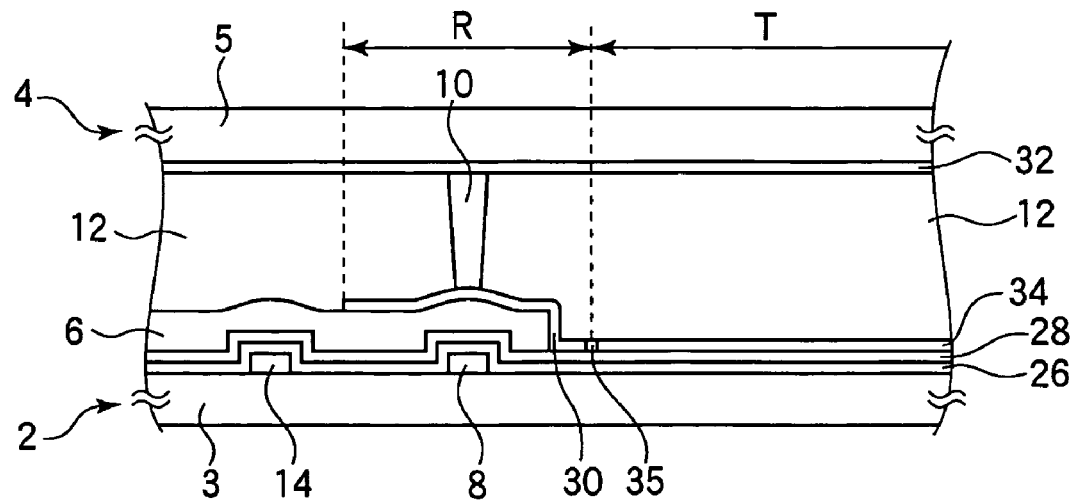
FIG. 4 is a sectional view of a transflective liquid crystal display which is Embodiment 2 of a liquid crystal display in the mode for carrying out the invention, taken in a direction perpendicular to the display screen.

Embodiment 2 of a liquid crystal display in the present mode for carrying out the invention will now be described with reference to FIG. 4. FIG. 4 shows a sectional configuration of one pixel of a liquid crystal display panel used in a transflective liquid crystal display. As shown in FIG. 4, the liquid crystal display panel has a TFT substrate 2, an opposite substrate 4 and a liquid crystal layer 12 sealed between the substrates 2 and 4. An irregularity controlling structure 8 is formed in a reflective area R on a glass substrate 3 that constitutes the TFT substrate 2. Further, an insulation film 26, a final protection film 28, a wrinkly irregular layer 6 and a reflective electrode 30 are formed in the order listed in the reflective area R so as to cover the irregularity controlling structure 8. A plurality of irregularities is formed on the surface of the reflective electrode 30 such that they follow the shape of the surface of the wrinkly irregular layer 6 located under the same. The reflective electrode 30 has a high light-reflecting property because of the plurality of irregularities formed on the surface thereof and therefore reflects external light incident thereupon so as to scatter it in various directions.

In a transmissive area T on the glass substrate 3, an insulation film 26, a final protection film 28, and a transparent electrode 34 are formed in the order listed. The transparent electrode 34 transmits light emitted by a backlight unit (not shown) which is provided under the region shown in FIG. 4. The transparent electrode 34 is electrically connected to the reflective electrode 30 of the same pixel through a barrier metal layer 35 made of titanium (Ti), molybdenum (Mo) or the like.

The opposite substrate 4 has a CF layer, which is not shown, formed on an opposite glass substrate 5. A transparent electrode 32 is formed throughout the substrate over the CF layer. Holding protrusions 10 protruding from the transparent electrode 32 are formed so as to extend up to convexes of the reflective electrode 30. The height of the concaves or convexes of the wrinkly irregular layer 6 is formed substantially uniform by the irregularity controlling structures 8. Therefore, a gap between the TFT substrate 2 and the opposite substrate 4 is maintained at a predetermined width by forming the plurality of holding protrusions 10 having substantially the same length at predetermined intervals on the convexes of the reflective electrode 30, which makes it possible to control the thickness of the liquid crystal layer 12 such that it becomes substantially constant.

As described above, in the transflective liquid crystal display having a reflective area R and a transmissive area T in each pixel, the thickness of the liquid crystal layer 12 can be controlled to be substantially constant in each of the reflective area R and the transmissive area T by maintaining the gap between the substrates of the liquid crystal display panel at a predetermined width using the holding protrusions 10 extending up to convexes of the reflective electrode 30 in the reflective area R.

Embodiment 3

Figure 5:
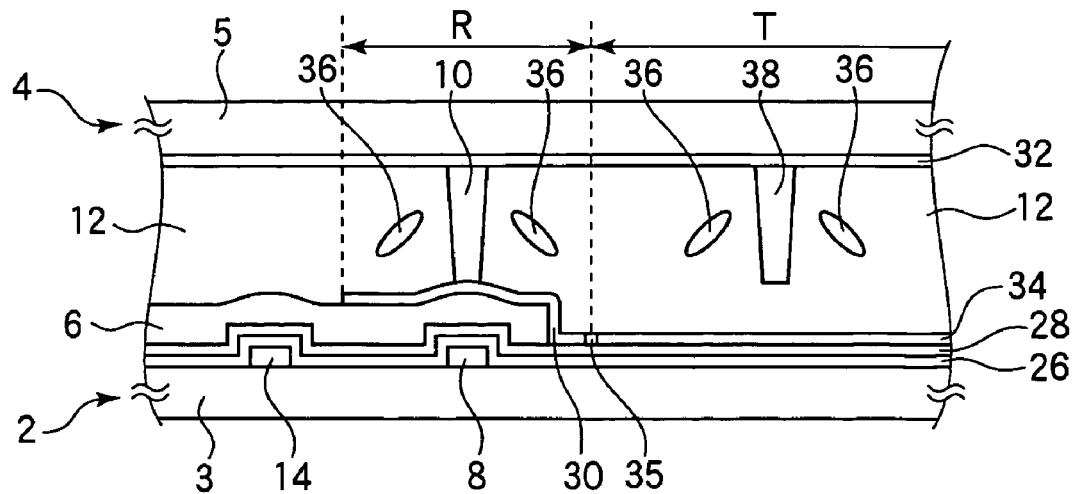
FIG. 5 is a sectional view of a transflective liquid crystal display utilizing an n-type VA liquid crystal which is Embodiment 3 of a liquid crystal display in the mode for carrying out the invention, taken in a direction perpendicular to the display screen.
Figure 6:
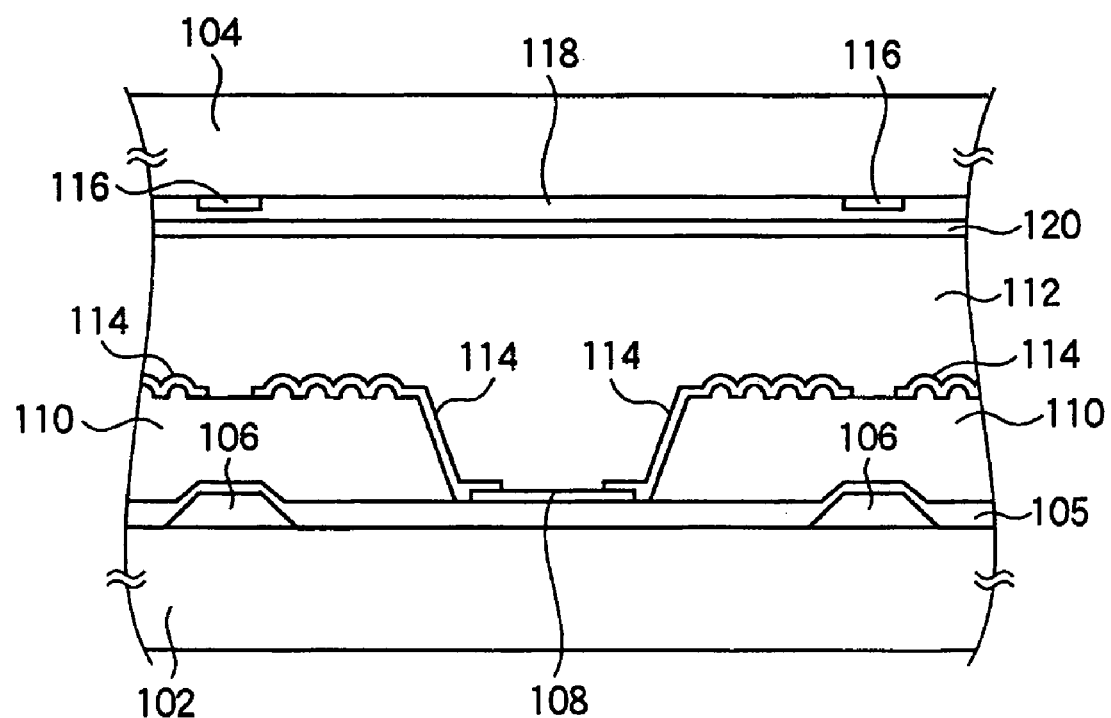
FIG. 6 is a sectional view of a conventional transflective liquid crystal display taken in a direction perpendicular to the display screen.

Embodiment 3 of a liquid crystal display in the present mode for carrying out the invention will now be described with reference to FIG. 5. FIG. 5 shows a sectional configuration of one pixel of a liquid crystal display panel provided in a transflective liquid crystal display utilizing a vertically aligned liquid crystal having negative dielectric anisotropy (an n-type VA liquid crystal). As shown in FIG. 5, the liquid crystal display panel of the present embodiment is characterized in that the alignment of liquid crystal molecules 36 is controlled by holding protrusions 10 which are formed in reflective areas R for maintaining the thickness of a liquid crystal layer 12 at a predetermined width. Alignment controlling protrusions 38 for controlling the alignment of the liquid crystal molecules 36 are formed in transmissive areas T. The alignment controlling protrusions 38 are formed to protrude from an opposite glass substrate 5 with substantially the same length as the holding protrusions 10. As a result, the alignment controlling protrusions 8 are not in contact with a transparent electrode 34. The sectional structure of the liquid crystal display of the present embodiment will not be described because it is similar to that in Embodiment 2 except that alignment controlling structures 38 are provided in transmissive areas T.

The gap between the TFT substrate 2 and the opposite substrate 4 can be maintained at a predetermined width by forming the plurality of holding protrusions 10 having substantially the same length on convexes of the reflective electrodes 30 at predetermined intervals just as in Embodiment 2 described above, which makes it possible to control the thickness of the liquid crystal layer 12 such that it becomes substantially constant. Further, a liquid crystal display having a wide viewing angle and a high contrast ratio can be provided because the tilting direction of the liquid crystal molecules 36 of the VA-type liquid crystal can be controlled using the alignment controlling protrusions 38 and the holding protrusions 10.

What is claimed is:

1. A liquid crystal display, comprising:
    a wrinkly irregular layer having a wrinkly irregular surface formed on a substrate;
    an opposite substrate provided opposite to a side of the substrate on which the wrinkly irregular layer is formed;
    a liquid crystal layer sealed between the substrate and the opposite substrate;
    an irregularity controlling structure formed under the wrinkly irregular layer on the substrate for controlling the orientation of a irregularities of the wrinkly irregular layer; and
    a holding protrusion formed on either concaves or convexes of the wrinkly irregular layer for holding the substrate and the opposite substrate with a predetermined gap left between them,
    wherein the irregularity controlling structure is formed from a material which is different from the wrinkly irregular layer in thermal deformation charcteristics.

2. A liquid crystal display according to claim 1, wherein the holding protrusion is formed to protrude from the opposite substrate.

3. A liquid crystal display according to claim 1, wherein the holding protrusion is formed to protrude from the wrinkly irregular layer.

4. A liquid crystal display according to claim 1, wherein the holding protrusion controls the alignment of the liquid crystal.

5. A liquid crystal display according to claim 1, wherein the wrinkly irregular layer is formed of a photosensitive resin such as a novolac type positive resist.

6. A liquid crystal display according to claim 1, further comprising a light-reflecting layer formed on the wrinkly irregular layer so as to follow the irregularities and reflect an incident light from the side of the opposite substrate.

7. A liquid crystal display according to claim 6, wherein the light-reflecting layer is formed also between the holding protrusion and the wrinkly irregular layer.

8. A liquid crystal display according to claim 1, further comprising a gate bus line formed on the substrate, a drain bus line formed so as to intersect the gate bus line with an insulation film interposed between them, and a pixel region formed at each intersection between the gate bus line and the drain bus line, wherein the irregularity controlling structure is formed of the same material as the gate bus line and/or the drain bus line.

9. A liquid crystal display according to claim 8, wherein the irregularity controlling structure is formed in the same layer as the gate bus line and/or the drain bus line.

10. A liquid crystal display according to claim 8, further comprising a light source which is provided on the side of the substrate, the pixel region having a reflective area in which the light-reflecting layer is formed and a transmissive area which transmits light emitted from the light source.

11. A liquid crystal display according to claim 1, wherein the liquid crystal has negative dielectric constant anisotropy and is vertically aligned when no voltage is applied.

12. A liquid crystal display according to claim 1, wherein a plurality of said holding protrusions are formed only on the convexes of the wrinkly irregular layer.

13. A liquid crystal display according to claim 1, wherein the irregularity controlling structure is formed directly on the substrate.

* * * * *